United States Patent Office 3,261,747
Patented July 19, 1966

3,261,747
STABILIZED IODINE LABELED 2'-DEOXY-5-
IODOURIDINE
Spencer L. Commerford, Shirley, N.Y., assignor to the
United States of America as represented by the United
States Atomic Energy Commission
No Drawing. Filed May 8, 1964, Ser. No. 366,202
2 Claims. (Cl. 167—51)

This invention is related to a stabilized composition of matter which is useful as a tracer in the biological and health fields.

In higher organisms cell division is preceded by deoxyribonucleic acid (hereinafter referred to as DNA) synthesis and DNA leaves the cell only at the time of its death. Therefore, a radioactive precursor specific for DNA may be used to measure processes of cellular proliferation and turnover. Such measurements are of great importance in the study of diseases such as cancer.

Others in the art have used 2'-deoxy-5-iodouridine, (hereinafter referred to as IDU) labeled with a radioactive isotope of iodine, e.g. iodine [131], iodine [124] etc. as a tracer. However in the past the use of labeled IDU having a high specific activity has been limited by the degradation of the IDU molecules caused by the radiation inherent in radioactive materials. In the past use of the IDU labeled tracer has been limited to the use of IDU compounds having a low specific activity in so for as radiation is concerned in order to prevent damage to the IDU molecules. Such complications can be avoided by using IDU having a low specific activity but this limits its usefulness as a biological tracer. By the term specific activity in this application I mean the ratio of the number of the molecules IDU containing a radioactive iodine isotope divided by the number of molecules of IDU containing the stable iodine isotope.

It is an object of this invention to provide those skilled in the art with IDU, labeled at a high specific activity with iodine isotopes which can be conveniently employed in the Biological and Health research field.

This and other objects of this invention will in part be obvious and will in part appear hereinafter.

I have discovered that the addition of relatively minute amounts of potassium triiodide will stabilize IDU compounds which have a high specific activity against degradation due to the inherent radiation of such compounds. It is to be understood that when radio-isotopically labeled IDU is employed it is usually in a very dilute aqueous solution in the order of $10^{-10}$ moles per liter of water. I have found that when from about $10^{-5}$ to about $10^{-1}$ moles of potassium triiodide is added per liter of labeled IDU containing aqueous solution that a stabilized solution is obtained. Incerasing the concentration of potassium triiodide within this range will increase the degree of protection obtained and the amount of radiation which can be protected against.

While it must be borne in mind that large amounts of potassium triiodide are toxic to most organisms this is not a bar to its direct use in most in vitro or in vivo biological and medical research experiments in the form it is utilized in my invention, to wit, a minute amount in a highly diluted solution. In addition my stabilized compositions can readily be detoxified by adding sodium thiosulphate to the compositions which reduces the potassium triiodide to a non-toxic form. Furthermore, the minute additions of potassium triiodide that I employ in my invention are bactericidal and fungicidal so that degradation of IDU by bacteria and fungi is also prevented. Thus another significant benefit is gained by the users of my invention.

The following example is given merely to illustrate the practical use of my invention:

*Example*

In this example one mililiter of iodine [131] carrier free radioiodide containing ten millicuries of iodine [131] activity was added to one mililiter of 2 molar nitric acid and twenty milligrams of deoxyuridine. The resulting mixture was heated in closed tube for one hour at 60° C. and then cooled to room temperature. 0.20 mililiter of 30% aqueous ammonium hydroxide solution was added to the cooled mixture to neutralize it. The neutralized mixture was then adsorbed upon an ion exchange resin (an ion exchange resin sold by the Dow Chemical Company under the tradename "Dowex X1-X10" a trimethylamine quaternary salt of a methylated copolymer of styrene and divinylbenzene having a 10 percent apparent divinylbenzene content as determined under standard conditions by 46-48 percent water content having a particle size ranging from about 200 to about 400 mesh). After washing the IDU adsorbed on the resin with 250 mililiters of an aqueous solution 0.10 molar in ammonium acetate and 0.05 molar in ammonium hydroxide the IDU was removed from the resin with 50 milliliters of 0.01 molar acetic acid. This acetic acid solution contained about 150 microcuries of iodine [131] per ml. Over 95% of the radio-activity was present as IDU as judged by the amount of activity which would co-crystallize with carrier IDU.

0.10 mililiter of a 0.10 molar potassium triiodide solution was added to a 10.0 mililiter aliquot of 0.01 molar acetic acid solution containing 150μc/ml. of I [131] labeled IDU and the resulting mixture was stored at room temperature for two weeks. At the end of this storage period it was ascertained that the mixture still had over 95% of its activity present as IDU whereas another aliquot to which no potassium triiodide has been added had only 62% of its activity present as IDU after storage. Thus it is readily obvious that my invention provides those skilled in the art with an efficient economical method of preparing and preserving radioactive iodine [131] isotope labeled IDU having a high specific activity.

I claim:

1. A stabilized composition of matter comprising:
   (a) water
   (b) up to about $10^{-10}$ moles per liter based upon the amount of water utilized in the composition of high specific activity 2'-deoxy-5-iodouridine containing radioactive isotopes of iodine
   (c) from about $10^{-5}$ moles to about $10^{-1}$ moles per liter of potassium triiodide based upon the amount of water utilized in the composition.

2. A process for stabilizing an in vitro biological tracer composed of an aqueous solution containing up to about $10^{-1}$ moles per liter of high specific activity 2'-deoxy-5-iodouridine comprising adding from about $10^{-5}$ to about $10^{-1}$ moles per liter of potassium triiodide to said solution.

References Cited by the Examiner

Prusoff et al., Chem. Abs., vol. 55, p. 3842 (1961).

BENJAMIN R. PADGETT, *Primary Examiner.*

L. A. SEBASTIAN, *Assistant Examiner.*